March 4, 1952 J. F. VEEVERS ET AL 2,587,668
READING ADJUSTMENT FOR AN INDICATING INSTRUMENT
IN HERMETICALLY SEALED CASES
Filed March 11, 1948 2 SHEETS—SHEET 1

INVENTORS
John Foster Veevers
AND
Henry Cobden Turner
BY
ATTORNEY

INVENTORS
JOHN FOSTER VEEVERS
HENRY COBDEN TURNER
BY
ATTORNEY

Patented Mar. 4, 1952

2,587,668

UNITED STATES PATENT OFFICE 2,587,668

READING ADJUSTMENT FOR AN INDICATING INSTRUMENT IN HERMETICALLY SEALED CASES

John Foster Veevers, Lymm, and Henry Cobden Turner, Hale, England, assignors to The General Electric Company, Limited, London, England Application March 11, 1948, Serial No. 14,324
In Great Britain January 3, 1947

6 Claims. (Cl. 116—129)

This invention is concerned with improvements in or relating to indicating instruments of the type which are fitted in, or provided with, hermetically sealed cases.

One disadvantage of a completely sealed instrument is that the normal methods of making adjustments to the position of the indicating member, for example, in order to set it to zero, cannot be used because of the difficulty of making a satisfactory seal around the adjusting mechanism which will still permit the use thereof.

One object of this invention is to provide means by which adjustments can be made to the position of the indicating member when the instrument is fitted in, or provided with, a hermetically sealed case.

According to this invention in an indicating instrument, fitted in or provided with a hermetically sealed case, an indicating member in said instrument can be adjusted from the outside of the case by the displacement of a flexible member such as a disc or diaphragm which is sealed in a gastight manner to said case, displacements of said flexible member being mechanically transmitted to said indicating member.

Figure 1:
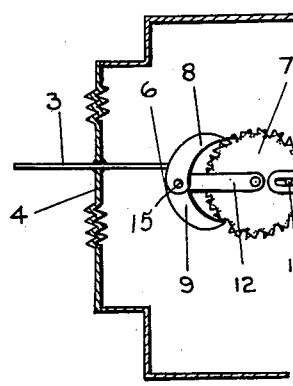

Two embodiments of the present invention will now be described, by way of example, with reference to the accompanying diagrammatic drawings in which Figure 1 shows in diagrammatic form a zero adjusting mechanism in accordance with the first embodiment.

Figure 2:
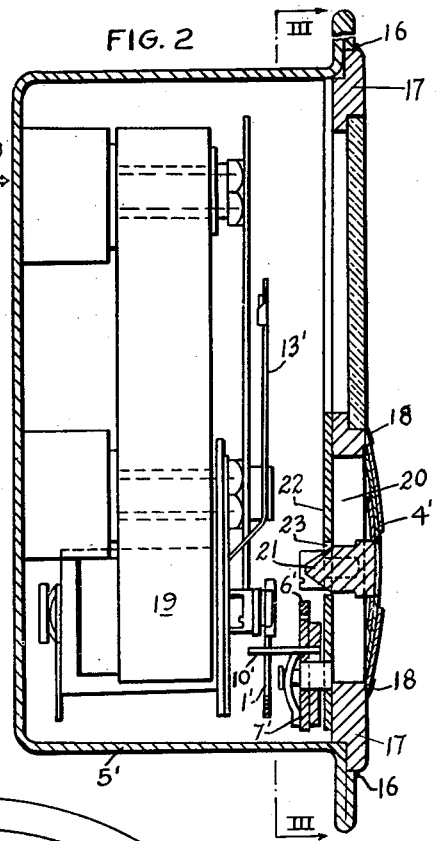
Figure 3:
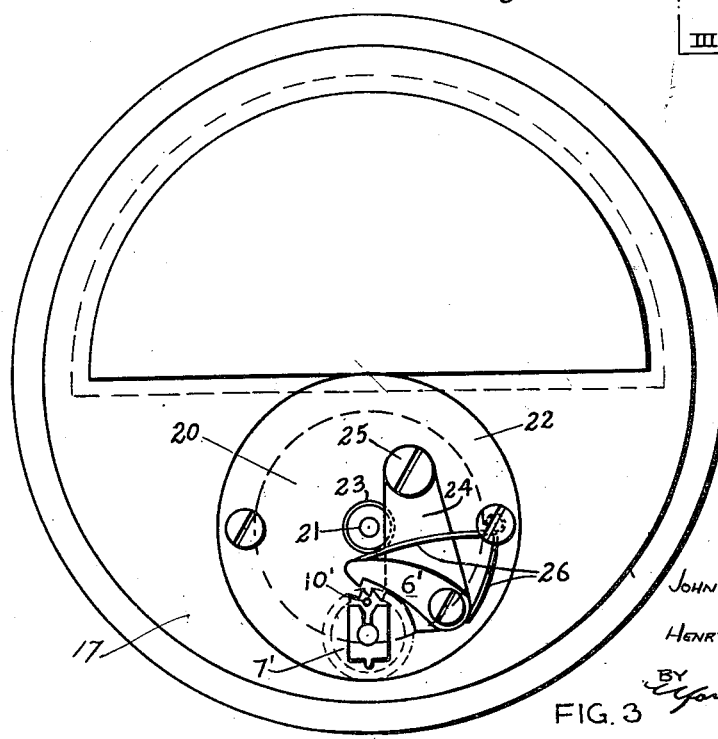
Figure 4:
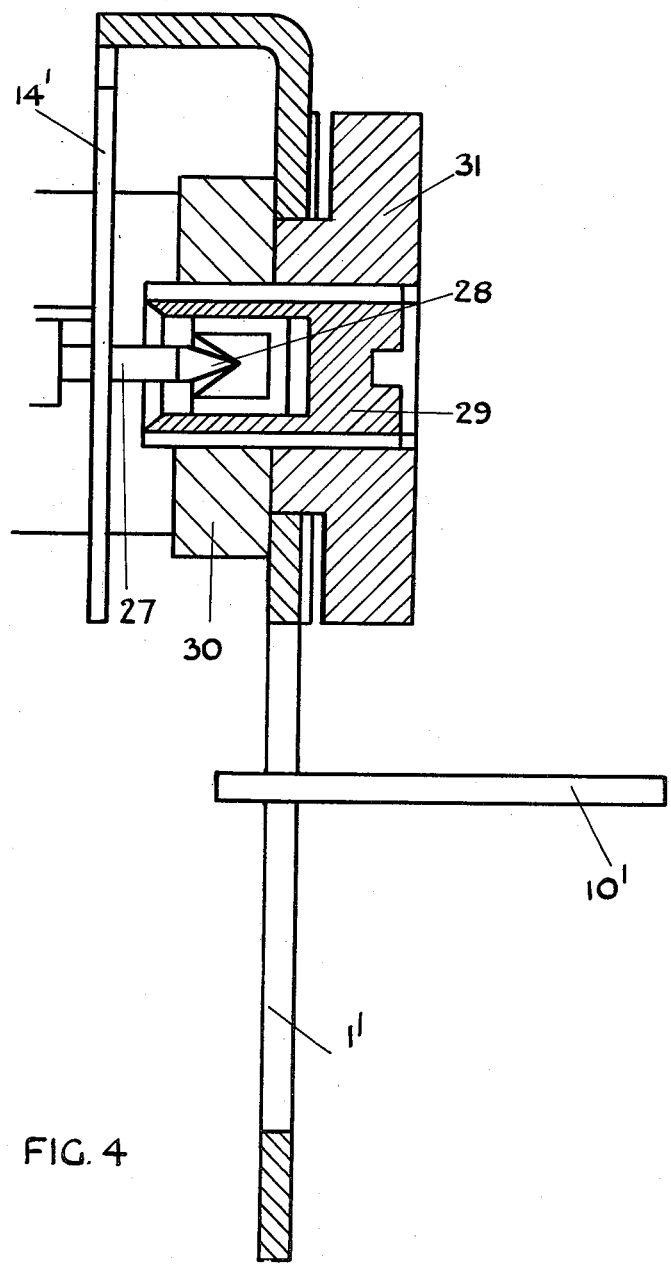

Figure 2 shows a sectional elevation of an instrument in accordance with the second embodiment, Figure 3 shows a plan view of the front cover of the instrument illustrated in Figure 2, as seen from the section line III—III in Figure 2, and Figure 4 is a view of part of the movement of the instrument illustrated in Figure 2.

In the first embodiment shown in Figure 1, the position of a pointer is adjusted by displacement of one of the hairsprings 14 of the movement of the instrument, one end of this hairspring 14 being attached to the lever 1. The mechanism for causing movement of the lever 1 about its pivot 2 comprises a rod 3, which is soldered in an aperture in a flexible disc or diaphragm 4 itself soldered in an aperture in the instrument case 5, joined to a double pawl 6 which co-operates with two ratchet wheels mounted on a common spindle, only one wheel 7 being in view in the figure. The claws 8 and 9 of the double pawl 6 lie in parallel planes and are rigidly mounted on a pivot 15 which is rotatable in a hole in a member 12 which locates the double pawl 6 relative to the ratchet wheels. The claw 8 engages with the ratchet wheel 7 whilst the claw 9 engages with the other ratchet wheel, the teeth of which face in the reverse direction to those on the ratchet wheel 7. A pin 10 on one side of the ratchet wheel 7 slides in a slot 11 in the lever 1, so that rotation of the ratchet wheel 7 causes movement of the lever 1 about its pivot 2, the direction of which movement is dependent upon the direction of rotation of the ratchet wheel 7.

The rod 3 is connected to the claw 8 so that it is off-center to the pivot 15. The effect of this off-center connection is that if the rod 3 is moved so that the diaphragm 4 is flexed inwards, the claw 8 engages with the ratchet wheel 7 and causes both ratchet wheels to revolve in a clockwise direction, whilst if the rod 3 is moved so that the diaphragm 4 is flexed outwards the claw 9 engages with the other ratchet wheel and causes both ratchet wheels to revolve in an anticlockwise direction. To obtain movement of the ratchet wheels greater than that corresponding to one tooth pitch, the rod 3 and therefore the diaphragm secured thereto, will have to be moved backwards and forwards a number of times, and the direction of rotation of the ratchet wheels will depend upon whether the to-and-fro oscillations of the diaphragm 4 are to one side or the other of the unflexed position of the diaphragm 4.

Rotation of the ratchet wheels will, through the lever 1, cause movement of the pointer 13 of the instrument in a direction dependent upon the direction of rotation of the ratchet wheel 7.

In the second embodiment of the invention shown in Figures 2, 3 and 4, the instrument case 5 is provided with a front cover 17 which is soldered to the case 5' as shown at 16 to form a hermetically sealed case for the instrument movement 19, which is of the well-known moving coil type and need not be described further for the purposes of this specification.

A flexible diaphragm 4' is sealed by soldering as shown at 18 to the outside of the cover 17 over an aperture 20 therein, the diaphragm 4' being fitted centrally with a tapered member 21 which projects into the interior of the case 5'. A circular plate 22 is fixed to the inside of the front cover 17 over the aperture 20, and is formed with a circular hole 23 therein through which the tapered member 21 can pass. A lever 24 pivoted at one end 25 on the circular plate 22 slightly overlaps the circular hole 23. On the free end of the lever 24 is pivoted a pawl 6' which is held in engagement with a ratchet wheel 7' by the leaf spring 26. A pin 10' fixed to the ratchet wheel 7' engages in a slot in the zero-adjuster arm 1' on the instrument movement 19.

The pointer 13' is carried on a spindle 27 which is mounted at each end by means of a jewel bearing 28 carried by a screw 29 which screws into a hole in a bridge piece 30 and is locked in position by means of a nut 31. One of the hairsprings 14' of the instrument movement is attached at its inner end to the spindle 27 and at its outer end to the arm 1', so that rotation of the arm 1' about the spindle 27 varies the zero adjustment of the pointer 13'.

To alter the zero-adjustment of the instrument from outside the sealed case the diaphragm 4' is pressed inwards. This causes the tapered member 21 to pass through the circular hole 23 and move the lever 24 sideways about its pivoted end 25, which causes the pawl 6' to move sideways also, and thus the ratchet wheel 7' rotates. When pressure is removed from the diaphragm 4', the pressure of the spring 26 will restore the pawl 6' and the lever 24 to their original positions. It will be understood that the pin 10' will describe a circular path about the centre of the spindle of the ratchet wheel 7' as the diaphragm 4' is moved backwards and forwards by varying or intermittent pressure thereon. This means that the movement of the pin 10' in the slot in the arm 1' will in one complete revolution of the ratchet wheel 7' first cause the arm 1', and hence the pointer 13', to move in one direction, and then in the other direction. Thus if the position of the pointer 13' is over-corrected when moving in one direction under the control of the zero adjuster, movement of the diaphragm 4' must be continued so that the pointer 13' changes its direction of movement and can be set to the required position.

We claim:

1. In combination, a hermetically sealed case, said case having an opening therein, an indicating instrument within said case, said instrument including an indicating member within said case, said instrument also including a movable member within said case for adjusting the position of said indicating member, a flexible member sealed over said opening, and a positive kinematic connection between said flexible member and said movable member whereby displacements of the flexible member will be mechanically transmitted to the movable member.

2. The combination according to claim 1, in which the movable member is comprised by a pivoted lever adapted to rotate through a limited angle.

3. The combination according to claim 1, in which the positive kinematic connection between the flexible member and the movable member includes a pawl and a ratchet wheel engageable by said pawl, means to connect said pawl to said flexible member, and means to connect said ratchet wheel to said movable member whereby displacement of said flexible member causes movement of said pawl and consequent rotation of said ratchet wheel to vary the position of said movable member.

4. The combination according to claim 1 in which the flexible member is provided with a projecting extension whereby movement of said projecting extension is transmitted to said flexible member.

5. In combination, a hermetically sealed case, said case having an aperture therein, an indicating instrument within said case, said instrument being provided with an indicating member, spring means determining the non-indicating position of said indicating member, a ratchet wheel, said spring means being connected to said ratchet wheel, a pawl engageable with said ratchet wheel, a flexible disc sealed over said aperture, and means to connect said disc to said pawl whereby displacement of said disc causes movement of said pawl and consequent rotation of said ratchet which through said spring means varies the non-indicating position of said indicating member.

6. The combination according to claim 5, in which the spring means is connected to the ratchet wheel by a pin secured to said ratchet wheel which engages in a slot in a pivoted member to which said spring means is attached, the length of said slot being greater than the diameter of the circle traced out by said pin during one revolution of the ratchet wheel, whereby the indicating member moves in one direction during substantially one half of a revolution of the ratchet wheel and moves in the opposite direction during the remainder of said revolution.

JOHN FOSTER VEEVERS.
HENRY COBDEN TURNER.

REFERENCES CITED

The following references are of record in the file of this patent:

UNITED STATES PATENTS

| Number | Name | Date |
| --- | --- | --- |
| 1,501,698 | Beckert | July 15, 1924 |